United States Patent
Kim et al.

(10) Patent No.: US 10,508,717 B1
(45) Date of Patent: Dec. 17, 2019

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Jin Ho Kim, Suwon-si (KR); Jae Joon Lee, Anyang-si (KR); Jong Sool Park, Hwaseong-si (KR); Kyeong Hun Lee, Seoul (KR); Jong Soo Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/129,920

(22) Filed: Sep. 13, 2018

(30) Foreign Application Priority Data

Jun. 25, 2018 (KR) .................. 10-2018-0072636

(51) Int. Cl.
*F16H 3/66* (2006.01)

(52) U.S. Cl.
CPC ....... *F16H 3/66* (2013.01); *F16H 2200/0069* (2013.01); *F16H 2200/2015* (2013.01); *F16H 2200/2046* (2013.01); *F16H 2200/2064* (2013.01)

(58) Field of Classification Search
CPC ............... F16H 3/66; F16H 2200/0069; F16H 2200/2046; F16H 2200/2015; F16H 2200/2064
See application file for complete search history.

*Primary Examiner* — Jeffrey A Shapiro
(74) *Attorney, Agent, or Firm* — Morgan, Lewis & Bockius LLP

(57) ABSTRACT

A planetary gear train may include input and output shafts, first to fifth planetary gear set, respectively having first to third, fourth to sixth, seventh to ninth, tenth to twelfth, and thirteenth to fifteenth elements, a first shaft fixedly connected to the second element and the input shaft, a second shaft fixedly connected to the fourteenth element and the output shaft, a third shaft fixedly connected to the third and fourth elements, a fourth shaft fixedly connected to the eighth element and the thirteenth element, a fifth shaft fixedly connected to the ninth element, a sixth shaft fixedly connected to the eleventh and fifteenth elements, a seventh shaft fixedly connected to the first and fifth elements, an eighth shaft fixedly connected to the sixth, seventh, and tenth elements, and a ninth shaft fixedly connected to the twelfth element.

20 Claims, 2 Drawing Sheets

FIG. 2

| Shift-stage | Engagement element | | | | | | Gear ratio | Step ratio | Remark |
|---|---|---|---|---|---|---|---|---|---|
| | C1 | C2 | C3 | B1 | B2 | B3 | | | |
| D1 | ● | | | ● | | ● | 4.866 | 1.630 | Gear ratio span: 9.0<br><br>Gear ratio of R/D1: 0.92 |
| D2 | ● | | | | ● | ● | 2.985 | 1.290 | |
| D3 | | ● | | | ● | ● | 2.314 | 1.306 | |
| D4 | ● | ● | | | | ● | 1.772 | 1.151 | |
| D5 | | ● | ● | | | ● | 1.540 | 1.229 | |
| D6 | ● | | ● | | | ● | 1.253 | 1.253 | |
| D7 | ● | ● | ● | | | | 1.000 | 1.198 | |
| D8 | ● | | ● | | ● | | 0.834 | 1.290 | |
| D9 | | ● | ● | | ● | | 0.647 | 1.199 | |
| D10 | | ● | ● | ● | | | 0.539 | | |
| REV | | | ● | ● | | ● | -4.481 | - | |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2018-0072636 filed on Jun. 25, 2018, the entire contents of which is incorporated herein for all purposes by this reference.

BACKGROUND OF THE INVENTION

Field of the Invention

The present invention relates to an automatic transmission for a vehicle.

Description of Related Art

In the field of an automatic transmission, more multiplicity of shifting stages is useful technology for enhancement of fuel consumption and drivability of a vehicle.

In this sense, research for an engine has been made to achieve weight reduction and to enhance fuel consumption by so-called downsizing and research on an automatic transmission has been performed to simultaneously provide better drivability and fuel consumption by achieving more shifting stages.

To achieve more shifting stages for an automatic transmission, the number of parts is typically increased, which may deteriorate installability, a production cost, weight and/or power flow efficiency.

Therefore, to maximally enhance fuel consumption of an automatic transmission having more shifting stages, it is important that better efficiency is derived by less number of parts.

In this background, an eight-speed automatic transmission has been introduced recently and a planetary gear train for an automatic transmission facilitating more shifting stages is under investigation.

Furthermore, a recent eight-speed automatic transmission typically shows a gear ratio span in a level of 6.5 to 7.5, which may require improvement for better fuel consumption.

In the case of a gear ratio span of an eight-speed automatic transmission having a level above 9.0, it is difficult to maintain step ratios between adjacent shifting stages to be linear, by which driving efficiency of an engine and drivability of a vehicle deteriorated. Thus, research studies are underway for developing a high efficiency automatic transmission having nine or more speeds.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle facilitating at least nine forward speeds, providing better performance and fuel efficiency of a vehicle.

A planetary gear train according to an exemplary embodiment of the present invention may include an input shaft receiving an engine torque, an output shaft outputting a shifted torque, a first planetary gear set having first, second, and third rotation elements, a second planetary gear set having fourth, fifth, and sixth rotation elements, a third planetary gear set having seventh, eighth, and ninth rotation elements, a fourth planetary gear set having tenth, eleventh, and twelfth rotation elements, a fifth planetary gear set having thirteenth, fourteenth, and fifteenth rotation elements, a first shaft fixedly connected to the second rotation element and the input shaft, a second shaft fixedly connected to the fourteenth rotation element and the output shaft, a third shaft fixedly connected to the third rotation element and the fourth rotation element, a fourth shaft fixedly connected to the eighth rotation element and the thirteenth rotation element, a fifth shaft fixedly connected to the ninth rotation element, a sixth shaft fixedly connected to the eleventh rotation element and the fifteenth rotation element, a seventh shaft fixedly connected to the first rotation element and the fifth rotation element, an eighth shaft fixedly connected to the sixth rotation element, the seventh rotation element, and the tenth rotation element, and a ninth shaft fixedly connected to the twelfth rotation element.

The planetary gear train may further include six engagement elements each selectively connecting a corresponding pair among the input shaft, the output shaft, the first to ninth shafts, and the transmission housing, wherein a plurality of shifting stages is realized by engaging three engagement elements for a respective shifting stage.

The six engagement elements may include three clutches each selectively connecting a corresponding pair among the first to ninth shafts, and three brakes each selectively connecting a corresponding shaft to the transmission housing.

The three clutches may include a first clutch disposed between the first shaft and the fourth shaft, a second clutch disposed between the third shaft and the fourth shaft, and a third clutch disposed between the fifth shaft and the sixth shaft.

The three brakes may include a first brake disposed between the seventh shaft and the transmission housing, a second brake disposed between the eighth shaft and the transmission housing, and a third brake disposed between the ninth shaft and the transmission housing.

The first, second, and third rotation elements may be respectively a first sun gear, a first planet carrier, and a first ring gear of the first planetary gear set. The fourth, fifth, and sixth rotation elements may be respectively a second sun gear, a second planet carrier, and a second ring gear of the second planetary gear set. The seventh, eighth, and ninth rotation elements may be respectively a third sun gear, a third planet carrier, and a third ring gear of the third planetary gear set. The tenth, eleventh, and twelfth rotation elements may be respectively a fourth sun gear, a fourth planet carrier, and a fourth ring gear of the fourth planetary gear set. The thirteenth, fourteenth, and fifteenth rotation elements may be respectively a fifth sun gear, a fifth planet carrier, and a fifth ring gear of the fifth planetary gear set.

The first, second, third, fourth, and fifth planetary gear sets may be disposed in an order of first, second, third, fourth, and fifth planetary gear sets from an engine side thereof.

A planetary gear train according to an exemplary embodiment of the present invention may realize at least ten forward speeds and at least one reverse speed formed by operating the five planetary gear sets of simple planetary gear sets by controlling six engagement elements.

Furthermore, a planetary gear train according to an exemplary embodiment of the present invention may realize a gear ratio span of more than 9.0, maximizing efficiency of driving an engine.

While employing five planetary gear sets for ten forward speeds and one reverse speed, engagement elements are minimally employed, reducing drag loss of clutches and brakes, and accordingly improving power delivery efficiency and fuel consumption.

Furthermore, a torque-in-parallel scheme is applied to an output-side planetary gear set, and thereby torque loads of planetary gear sets and engagement elements may become more uniform, such that torque delivery efficiency and durability may be enhanced.

While realizing ten forward speeds and one reverse speed, flexibility of output gear ratio is increased, enhancing linearity of step ratios of shifting stages.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart for respective control elements at each shifting stage applicable to a planetary gear train according to an exemplary embodiment of the present invention.

Figure 1:
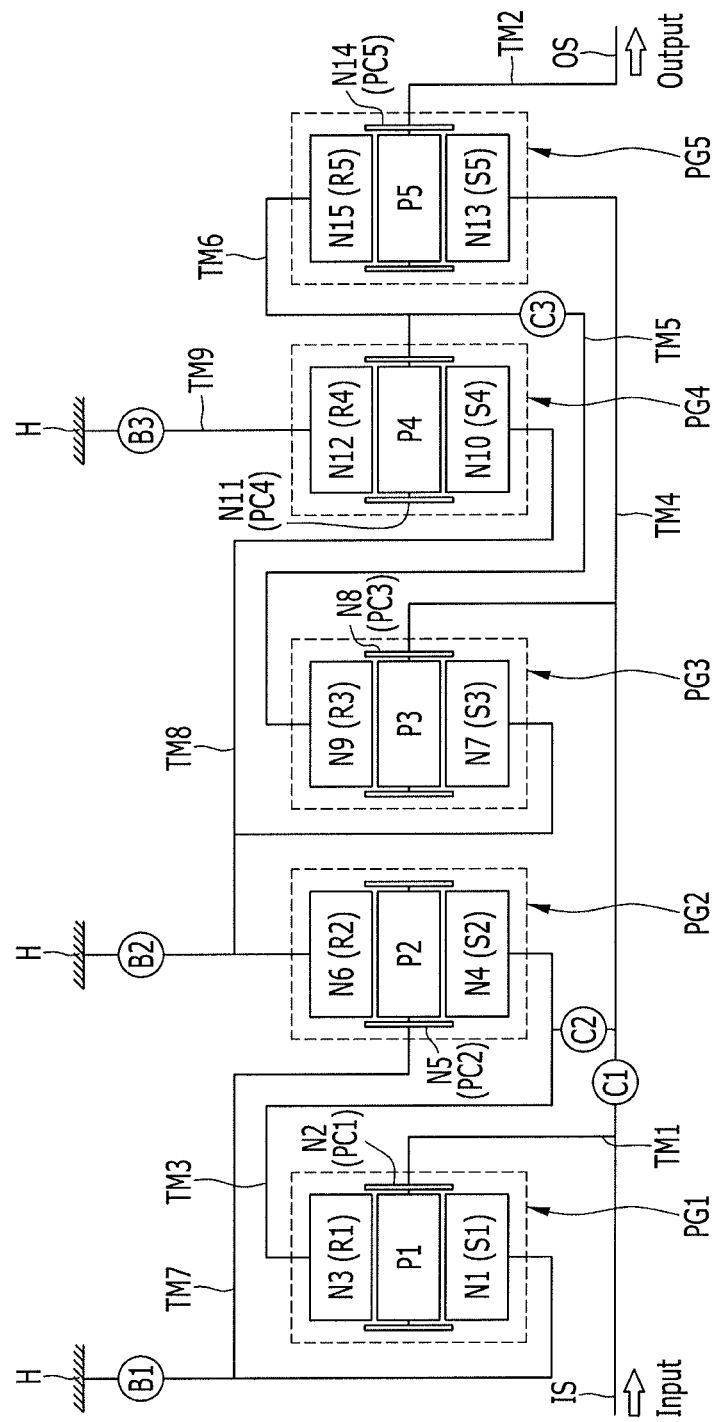
FIG. 1 is a schematic diagram of a planetary gear train according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, an exemplary embodiment of the present invention will be described in detail with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention.

Referring to FIG. 1, a planetary gear train according to an exemplary embodiment of the present invention includes first, second, third, fourth, and fifth planetary gear sets PG1, PG2, PG3, PG4, and PG5 disposed on a same axis, an input shaft IS, an output shaft OS, nine shafts TM1 to TM9 interconnecting rotation elements of the first, second, third, fourth, and fifth planetary gear sets PG1, PG2, PG3, PG4, and PG5, engagement elements of three clutches C1 to C3 and three brakes B1 to B3, and a transmission housing H.

A torque received from an engine through the input shaft IS is changed by cooperative operation of the first, second, third, fourth, and fifth planetary gear sets PG1, PG2, PG3, PG4, and PG5, and a shifted torque is output through the output shaft OS.

In an exemplary embodiment of the present invention, the planetary gear sets are disposed in the order of the first, second, third, fourth, and fifth planetary gear sets PG1, PG2, PG3, PG4, and PG5, from an engine side, i.e., from an input side thereof.

The input shaft IS is an input member and the torque from a crankshaft of an engine is input into the input shaft IS, after being torque-converted through a torque converter.

The output shaft OS is an output element disposed on a same axis with the input shaft IS, and outputs a shifted driving torque to a driveshaft through a differential apparatus.

The first planetary gear set PG1 is a single pinion planetary gear set, and includes a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and includes a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2. The second sun gear S2 acts as a fourth rotation element N4, the second planet carrier PC2 acts as a fifth rotation element N5, and the second ring gear R2 acts as a sixth rotation element N6.

The third planetary gear set PG3 is a single pinion planetary gear set, and includes a third sun gear S3, a third planet carrier PC3 rotatably supporting a plurality of third pinion gears P3 externally gear-meshed with the third sun gear S3, and a third ring gear R3 internally gear-meshed with the plurality of third pinion gears P3. The third sun gear S3 acts as a seventh rotation element N7, the third planet carrier PC3 acts as an eighth rotation element N8, and the third ring gear R3 acts as a ninth rotation element N9.

The fourth planetary gear set PG4 is a single pinion planetary gear set, and includes a fourth sun gear S4, a fourth planet carrier PC4 rotatably supporting a plurality of fourth pinion gears P4 externally gear-meshed with the fourth sun gear S4, and a fourth ring gear R4 internally gear-meshed with the plurality of fourth pinion gears P4. The fourth sun gear S4 acts as a tenth rotation element N10, the fourth planet carrier PC4 acts as an eleventh rotation element N11, and the fourth ring gear R4 acts as a twelfth rotation element N12.

The fifth planetary gear set PG5 is a single pinion planetary gear set, and includes a fifth sun gear S5, a fifth planet carrier PC5 rotatably supporting a plurality of fifth pinion gears P5 externally gear-meshed with the fifth sun gear S5, and a fifth ring gear R5 internally gear-meshed with the plurality of fifth pinion gears P5. The fifth sun gear S5 acts as a thirteenth rotation element N13, the fifth planet carrier PC5 acts as a fourteenth rotation element N14, and the fifth ring gear R5 acts as a fifteenth rotation element N15.

In the first, second, third, fourth, and fifth planetary gear sets PG1, PG2, PG3, PG4, and PG5, the first rotation element N1 and the fifth rotation element N5 are fixedly interconnected, the third rotation element N3 and the fourth rotation element N4 are fixedly interconnected, the sixth rotation element N6, the seventh rotation element N7, and the tenth rotation element N10 are fixedly interconnected, the eighth rotation element N8 and the thirteenth rotation element N13 are fixedly interconnected, the eleventh rotation element N11 and the fifteenth rotation element N15 are fixedly interconnected, and nine shafts TM1 to TM9 are formed.

The nine shafts TM1 to TM9 are hereinafter described in detail.

The first shaft TM1 is fixedly connected to the second rotation element N2 (first planet carrier PC1), and fixedly connected to the input shaft IS thereby always acting as an input element.

The second shaft TM2 is fixedly connected to the fourteenth rotation element N14 (fifth planet carrier PC5), and fixedly connected to the output shaft OS thereby always acting as an output element.

The third shaft TM3 is fixedly connected to the third rotation element N3 (first ring gear R1) and the fourth rotation element N4 (second sun gear S2).

The fourth shaft TM4 is fixedly connected to the eighth rotation element N8 (third planet carrier PC3) and the thirteenth rotation element N13 (fifth sun gear S5).

The fifth shaft TM5 is fixedly connected to the ninth rotation element N9 (third ring gear R3).

The sixth shaft TM6 is fixedly connected to the eleventh rotation element N11 (fourth planet carrier PC4) and the fifteenth rotation element N15 (fifth ring gear R5).

The seventh shaft TM7 is fixedly connected to the first rotation element N1 (first sun gear S1) and the fifth rotation element N5 (second planet carrier PC2).

The eighth shaft TM8 is fixedly connected to the sixth rotation element N6 (second ring gear R2), the seventh rotation element N7 (third sun gear S3), and the tenth rotation element N10 (fourth sun gear S4).

The ninth shaft TM9 is fixedly connected to the twelfth rotation element N12 (fourth ring gear R4).

Each of the nine shafts TM1 to TM9 may be a rotation member that fixedly interconnects the input and output shafts and rotation elements of the planetary gear sets PG1, PG2, PG3, PG4, and PG5, or may be a rotation member that selectively interconnects a rotation element to the transmission housing H, or may be a fixed member fixed to the transmission housing H.

In the disclosure, when two or more members are described to be "fixedly connected", where the member may be any of a shaft, an input shaft, an output shaft, a rotation member, and a transmission housing, it means that the fixedly connected members always rotate at a same speed.

When two or more members are described to be "selectively connectable" by an engagement element, it means that the selectively connectable members rotate separately when the engagement element is not engaged, and rotates at a same speed when the engagement element is engaged. It may be understood that in the case that a member is "selectively connectable" with a transmission housing by an engagement element, the member may be stationary when the engagement element is engaged.

The first shaft TM1 and the third shaft TM3 are selectively connectable to the fourth shaft TM4, and the fifth shaft TM5 is selectively connectable to the sixth shaft TM6.

Furthermore, the seventh shaft TM7, the eighth shaft TM8, and ninth shaft TM9 are selectively connectable to the transmission housing H, selectively acting as a fixed element.

Three engagement elements of clutches C1, C2, and C3 are disposed between the nine shafts TM1 to TM9, the input shaft IS, and the output shaft OS, to form selective connections.

The three engagement elements of brakes B1, B2, and B3 are disposed between the nine shafts TM1 to TM9 and the transmission housing H, to form selective connections.

The six engagement elements of the three clutches C1 to C3 and the three brakes B1 to B3 are disposed as follows.

The first clutch C1 is disposed between the first shaft TM1 and the fourth shaft TM4, and selectively connects the first shaft TM1 and the fourth shaft TM4, controlling power delivery therebetween.

The second clutch C2 is disposed between the third shaft TM3 and the fourth shaft TM4, and selectively connects the third shaft TM3 and the fourth shaft TM4, controlling power delivery therebetween.

The third clutch C3 is disposed between the fifth shaft TM5 and the sixth shaft TM6, and selectively connects the fifth shaft TM5 and the sixth shaft TM6, controlling power delivery therebetween.

The first brake B1 is disposed between the seventh shaft TM7 and the transmission housing H, and selectively connects the seventh shaft TM7 to the transmission housing H.

The second brake B2 is disposed between the eighth shaft TM8 and the transmission housing H, and selectively connects the eighth shaft TM8 to the transmission housing H.

The third brake B3 is disposed between the ninth shaft TM9 and the transmission housing H, and selectively connects the ninth shaft TM9 to the transmission housing H.

The engagement elements of the first, second, and third clutches C1, C2, and C3 and the first, second, and third brakes B1, B2, and B3 may be realized as multi-plate hydraulic pressure friction devices that are frictionally engaged by hydraulic pressure, however, it may not be understood to be limited thereto, since various other configuration that are electrically controllable may be available.

FIG. 2 is an operation chart for respective control elements at each shifting stage applicable to a planetary gear train according to an exemplary embodiment of the present invention.

Referring to FIG. 2, a planetary gear train according to an exemplary embodiment of the present invention realizes ten forward speeds and one reverse speed by operating three engagements among the first, second, and third clutches C1, C2, and C3 and first, second, third brake B1, B2, and B3.

In the first forward speed D1, the first clutch C1 and the first and third brakes B1 and B3 are simultaneously operated.

As a result, the first shaft TM1 and the fourth shaft TM4 are connected by the operation of the first clutch C1. In the instant state, the input torque is input to the first shaft TM1 and the fourth shaft TM4.

In such a state, the seventh and ninth shafts TM7 and TM9 act as fixed elements by the operation of the first and third brakes B1 and B3, realizing the first forward speed and outputting a shifted torque to the output shaft OS connected to the second shaft TM2.

In the second forward speed D2, the first clutch C1 and the second and third brakes B2 and B3 are simultaneously operated.

As a result, the first shaft TM1 and the fourth shaft TM4 are connected by the operation of the first clutch C1. In the instant state, the input torque is input to the first shaft TM1 and the fourth shaft TM4.

In such a state, the eighth and ninth shafts TM8 and TM9 act as fixed elements by the operation of the second and third brakes B2 and B3, realizing the second forward speed and outputting a shifted torque to the output shaft OS connected to the second shaft TM2.

In the third forward speed D3, the second clutch C2 and the second and third brakes B2 and B3 are simultaneously operated.

As a result, the third shaft TM3 and the fourth shaft TM4 are connected by the operation of the second clutch C2. In the instant state, the input torque is input to the first shaft TM1.

In such a state, the eighth and ninth shafts TM8 and TM9 act as fixed elements by the operation of the second and third brakes B2 and B3, realizing the third forward speed and outputting a shifted torque to the output shaft OS connected to the second shaft TM2.

In the fourth forward speed D4, the first and second clutch C1 and C2 and the third brake B3 are simultaneously operated.

As a result, the first shaft TM1 and the fourth shaft TM4 are connected by the operation of the first clutch C1, and the third shaft TM3 and the fourth shaft TM4 are connected by the operation of the second clutch C2. In the instant state, the input torque is input to the first shaft TM1 and the fourth shaft TM4.

Furthermore, the ninth shaft TM9 acts as a fixed element by the operation of the third brake B3, realizing the fourth forward speed and outputting a shifted torque to the output shaft OS connected to the second shaft TM2.

In the fifth forward speed D5, the second and third clutches C2 and C3 and the third brake B3 are simultaneously operated.

As a result, the third shaft TM3 and the fourth shaft TM4 are connected by the operation of the second clutch C2, and the fifth shaft TM5 and the sixth shaft TM6 are connected by the operation of the third clutch C3. In the instant state, the input torque is input to the first shaft TM1.

Furthermore, the ninth shaft TM9 acts as a fixed element by the operation of the third brake B3, realizing the fifth forward speed and outputting a shifted torque to the output shaft OS connected to the second shaft TM2.

In the sixth forward speed D6, the first and third clutches C1 and C3 and the third brake B3 are simultaneously operated.

As a result, the first shaft TM1 and the fourth shaft TM4 are connected by the operation of the first clutch C1, and the fifth shaft TM5 and the sixth shaft TM6 are connected by the operation of the third clutch C3. In the instant state, the input torque is input to the first shaft TM1 and the fourth shaft TM4.

Furthermore, the ninth shaft TM9 acts as a fixed element by the operation of the third brake B3, realizing the sixth forward speed and outputting a shifted torque to the output shaft OS connected to the second shaft TM2.

In the seventh forward speed D7, the first, second, and third clutches C1, C2, and C3 are simultaneously operated.

As a result, the first shaft TM1 and the fourth shaft TM4 are connected by the operation of the first clutch C1, the third shaft TM3 and the fourth shaft TM4 are connected by the operation of the second clutch C2, and the fifth shaft TM5 and the sixth shaft TM6 are connected by the operation of the third clutch C3.

As such, the first, second, third, fourth, and fifth planetary gear sets PG1, PG2, PG3, PG4, and PG5 integrally rotate, and when the input torque received through the first shaft TM1 and the fourth shaft TM4 is output as inputted, realizing the seventh forward speed and outputting a shifted torque through the output shaft OS connected to the second shaft TM2.

In the eighth forward speed D8, the first and third clutches C1 and C3 and the second brake B2 are simultaneously operated.

As a result, the first shaft TM1 and the fourth shaft TM4 are connected by the operation of the first clutch C1, and the fifth shaft TM5 and the sixth shaft TM6 are connected by the operation of the third clutch C3. In the instant state, the input torque is input to the first shaft TM1 and the fourth shaft TM4.

Furthermore, the eighth shaft TM8 acts as a fixed element by the operation of the second brake B2, realizing the eighth forward speed and outputting a shifted torque to the output shaft OS connected to the second shaft TM2.

In the ninth forward speed D9, the second and third clutches C2 and C3 and the second brake B2 are simultaneously operated.

As a result, the third shaft TM3 and the fourth shaft TM4 are connected by the operation of the second clutch C2, and the fifth shaft TM5 and the sixth shaft TM6 are connected by the operation of the third clutch C3. In the instant state, the input torque is input to the first shaft TM1.

Furthermore, the eighth shaft TM8 acts as a fixed element by the operation of the second brake B2, realizing the ninth forward speed and outputting a shifted torque to the output shaft OS connected to the second shaft TM2.

In the tenth forward speed D10, the second and third clutches C2 and C3 and the first brake B1 are simultaneously operated.

As a result, the third shaft TM3 and the fourth shaft TM4 are connected by the operation of the second clutch C2, and the fifth shaft TM5 and the sixth shaft TM6 are connected by the operation of the third clutch C3. In the instant state, the input torque is input to the first shaft TM1.

Furthermore, the seventh shaft TM7 acts as a fixed element by the operation of the first brake B1, realizing the tenth forward speed and outputting a shifted torque to the output shaft OS connected to the second shaft TM2.

In the reverse speed REV, the third clutch C3 and the first and third brakes B1 and B3 are simultaneously operated.

As a result, the fifth shaft TM5 and the sixth shaft TM6 are connected by the operation of the third clutch C3. In the instant state, the input torque is input to the first shaft TM1.

In such a state, the seventh and ninth shafts TM7 and TM9 act as fixed elements by the operation of the first and third brakes B1 and B3, realizing the reverse speed and outputting a shifted torque to the output shaft OS connected to the second shaft TM2.

A planetary gear train according to an exemplary embodiment of the present invention may realize ten forward speeds and one reverse speed by controlling five planetary gear sets PG1, PG2, PG3, PG4, and PG5 by 6 control elements of three clutches C1, C2, and C3 and three brakes B1, B2, and B3.

Furthermore, a planetary gear train according to an exemplary embodiment of the present invention may realize a gear ratio span of more than 9.0, maximizing efficiency of driving an engine.

While realizing ten forward speeds and one reverse speed, engagement elements are minimally employed, reducing drag loss of clutches and brakes, and accordingly improving power delivery efficiency and fuel consumption.

Furthermore, a torque-in-parallel scheme is applied to an output-side planetary gear set, and thereby torque loads of planetary gear sets and engagement elements may become more uniform, such that torque delivery efficiency and durability may be enhanced.

While employing five planetary gear sets for ten forward speeds and one reverse speed, flexibility of output gear ratio is increased, enhancing linearity of step ratios of shifting stages.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train apparatus of an automatic transmission for a vehicle, the apparatus comprising:
   an input shaft receiving an engine torque;
   an output shaft outputting a shifted torque;
   a first planetary gear set having a first rotation element, a second rotation element, and a third rotation element;
   a second planetary gear set having a fourth rotation element, a fifth rotation element, and a sixth rotation element;
   a third planetary gear set having a seventh rotation element, an eighth rotation element, and a ninth rotation element;
   a fourth planetary gear set having a tenth rotation element, an eleventh rotation element, and a twelfth rotation element;
   a fifth planetary gear set having a thirteenth rotation element, a fourteenth rotation element, and a fifteenth rotation element;
   a first shaft fixedly connected to the second rotation element and the input shaft;
   a second shaft fixedly connected to the fourteenth rotation element and the output shaft;
   a third shaft fixedly connected to the third rotation element and the fourth rotation element;
   a fourth shaft fixedly connected to the eighth rotation element and the thirteenth rotation element;
   a fifth shaft fixedly connected to the ninth rotation element;
   a sixth shaft fixedly connected to the eleventh rotation element and the fifteenth rotation element;
   a seventh shaft fixedly connected to the first rotation element and the fifth rotation element;
   an eighth shaft fixedly connected to the sixth rotation element, the seventh rotation element, and the tenth rotation element; and
   a ninth shaft fixedly connected to the twelfth rotation element.

2. The planetary gear train apparatus of claim 1, further including six engagement elements each selectively connecting a corresponding pair among the input shaft, the output shaft, the first to ninth shafts, and a transmission housing,
   wherein a plurality of shifting stages is realized by engaging three engagement elements among the six engagement elements for each shifting stage of the plurality of shifting stages.

3. The planetary gear train apparatus of claim 2, wherein the six engagement elements include:
   three clutches each selectively connecting a corresponding pair among the first to ninth shafts; and
   three brakes each selectively connecting a corresponding shaft among the first to ninth shafts to the transmission housing.

4. The planetary gear train apparatus of claim 3,
   wherein the three clutches comprise:
   a first clutch mounted between the first shaft and the fourth shaft;
   a second clutch mounted between the third shaft and the fourth shaft; and
   a third clutch mounted between the fifth shaft and the sixth shaft, and
   wherein the three brakes comprise:
   a first brake mounted between the seventh shaft and the transmission housing;
   a second brake mounted between the eighth shaft and the transmission housing; and
   a third brake mounted between the ninth shaft and the transmission housing.

5. The planetary gear train apparatus of claim 1,
   wherein the first rotation element, the second rotation element, and the third rotation element are a first sun gear, a first planet carrier, and a first ring gear of the first planetary gear set, respectively;
   wherein the fourth rotation element, the fifth rotation element, and the sixth rotation element are a second sun gear, a second planet carrier, and a second ring gear of the second planetary gear set, respectively;
   wherein the seventh rotation element, the eighth rotation element, and the ninth rotation element are a third sun gear, a third planet carrier, and a third ring gear of the third planetary gear set, respectively;
   wherein the tenth rotation element, the eleventh rotation element, and the twelfth rotation element are a fourth sun gear, a fourth planet carrier, and a fourth ring gear of the fourth planetary gear set, respectively; and
   wherein the thirteenth rotation element, the fourteenth rotation element, and the fifteenth rotation element are a fifth sun gear, a fifth planet carrier, and a fifth ring gear of the fifth planetary gear set, respectively.

6. The planetary gear train apparatus of claim 1, wherein the first, second, third, fourth, and fifth planetary gear sets are disposed in an order of the first, second, third, fourth, and fifth planetary gear sets from an engine side thereof.

7. A planetary gear train apparatus of an automatic transmission for a vehicle, the apparatus comprising:
- an input shaft receiving an engine torque;
- an output shaft outputting a shifted torque;
- a first planetary gear set having a first rotation element, a second rotation element, and a third rotation element;
- a second planetary gear set having a fourth rotation element, a fifth rotation element, and a sixth rotation element;
- a third planetary gear set having a seventh rotation element, an eighth rotation element, and a ninth rotation element;
- a fourth planetary gear set having a tenth rotation element, an eleventh rotation element, and a twelfth rotation element;
- a fifth planetary gear set having a thirteenth rotation element, a fourteenth rotation element, and a fifteenth rotation element;
- a first shaft fixedly connected to the second rotation element and the input shaft;
- a second shaft fixedly connected to the fourteenth rotation element and the output shaft;
- a third shaft fixedly connected to the third rotation element and the fourth rotation element;
- a fourth shaft fixedly connected to the eighth rotation element and the thirteenth rotation element;
- a fifth shaft fixedly connected to the ninth rotation element;
- a sixth shaft fixedly connected to the eleventh rotation element and the fifteenth rotation element; and
- a plurality of shafts each selectively connecting a corresponding element to a transmission housing, the corresponding element being a rotation element of the first to fourth planetary gear sets which is not fixedly interconnected.

8. The planetary gear train apparatus of claim 7, wherein the plurality of shafts comprises:
- a seventh shaft fixedly connected to the first rotation element and the fifth rotation element;
- an eighth shaft fixedly connected to the sixth rotation element, the seventh rotation element, and the tenth rotation element; and
- a ninth shaft fixedly connected to the twelfth rotation element.

9. The planetary gear train apparatus of claim 8, wherein the first and fourth shafts, the third and fourth shafts, and the fifth and sixth shafts are selectively interconnected, respectively.

10. The planetary gear train apparatus of claim 8, further including three clutches each selectively connecting a corresponding pair among the first to ninth shafts.

11. The planetary gear train apparatus of claim 10, wherein the three clutches comprise:
- a first clutch mounted between the first shaft and the fourth shaft;
- a second clutch mounted between the third shaft and the fourth shaft; and
- a third clutch mounted between the fifth shaft and the sixth shaft.

12. The planetary gear train apparatus of claim 8, further including three brakes selectively connecting the seventh shaft, the eighth shaft, and the ninth shaft to the transmission housing.

13. The planetary gear train apparatus of claim 12, wherein the three brake comprise:
- a first brake mounted between the seventh shaft and the transmission housing;
- a second brake mounted between the eighth shaft and the transmission housing; and
- a third brake mounted between the ninth shaft and the transmission housing.

14. The planetary gear train apparatus of claim 7,
- wherein the first rotation element, the second rotation element, and the third rotation element are a first sun gear, a first planet carrier, and a first ring gear of the first planetary gear, respectively;
- wherein the fourth rotation element, the fifth rotation element, and the sixth rotation element are a second sun gear, a second planet carrier, and a second ring gear of the second planetary gear, respectively;
- wherein the seventh rotation element, the eighth rotation element, and the ninth rotation element are a third sun gear, a third planet carrier, and a third ring gear of the third planetary gear, respectively;
- wherein the tenth rotation element, the eleventh rotation element, and the twelfth rotation element are a fourth sun gear, a fourth planet carrier, and a fourth ring gear of the fourth planetary gear, respectively;
- wherein the thirteenth rotation element, the fourteenth rotation element, and the fifteenth rotation element are a fifth sun gear, a fifth planet carrier, and a fifth ring gear of the fifth planetary gear, respectively.

15. The planetary gear train apparatus of claim 7, wherein the first, second, third, fourth, and fifth planetary gear sets are disposed in an order of the first, second, third, fourth, and fifth planetary gear sets from an engine side thereof.

16. A planetary gear train apparatus of an automatic transmission for a vehicle, the apparatus comprising:
- an input shaft receiving an engine torque;
- an output shaft outputting a shifted torque;
- a first planetary gear set having a first rotation element, a second rotation element, and a third rotation element;
- a second planetary gear set having a fourth rotation element, a fifth rotation element, and a sixth rotation element;
- a third planetary gear set having a seventh rotation element, an eighth rotation element, and a ninth rotation element;
- a fourth planetary gear set having a tenth rotation element, an eleventh rotation element, and a twelfth rotation element;
- a fifth planetary gear set having a thirteenth rotation element, a fourteenth rotation element, and a fifteenth rotation element;
- wherein the second rotation element is fixedly connected to the input shaft,
- wherein the fourteenth rotation element is fixedly connected to the output shaft,
- wherein the first rotation element is fixedly connected to the fifth rotation element, and selectively connectable to a transmission housing,
- wherein the third rotation element is fixedly connected to the fourth rotation element, wherein the sixth rotation element is fixedly connected to the seventh rotation element, and selectively connectable to the tenth rotation element, transmission housing, wherein the eighth rotation element is fixedly connected to the thirteenth rotation element, and selectively connectable to the second rotation element and the fourth rotation element, wherein the eleventh rotation element is fixedly connected to the fifteenth rotation element, and selectively connectable to the ninth rotation element, wherein the twelfth rotation element is selectively connectable to the transmission housing.

17. The planetary gear train apparatus of claim 16, further including:
    three clutches each selectively connecting a corresponding pair among the first to fifteenth rotation elements; and
    three brakes each selectively connecting the first rotation element, the sixth rotation element, and the twelfth rotation element to the transmission housing, respectively.

18. The planetary gear train apparatus of claim 17, wherein the three clutches comprise:
    a first clutch mounted between the second rotation element and the eighth rotation element;
    a second clutch mounted between the fourth rotation element and the eighth rotation element; and
    a third clutch mounted between the ninth rotation element and the eleventh rotation element, and
    wherein the three brakes comprise:
    a first brake mounted between the first rotation element and the transmission housing;
    a second brake mounted between the sixth rotation element and the transmission housing; and
    a third brake mounted between the twelfth rotation element and the transmission housing.

19. The planetary gear train apparatus of claim 16,
    wherein the first rotation element, the second rotation element, and the third rotation element are a first sun gear, a first planet carrier, and a first ring gear of the first planetary gear set, respectively;
    wherein the fourth rotation element, the fifth rotation element, and the sixth rotation element are a second sun gear, a second planet carrier, and a second ring gear of the second planetary gear set, respectively;
    wherein the seventh rotation element, the eighth rotation element, and the ninth rotation element are a third sun gear, a third planet carrier, and a third ring gear of the third planetary gear set, respectively;
    wherein the tenth rotation element, the eleventh rotation element, and the twelfth rotation element are a fourth sun gear, a fourth planet carrier, and a fourth ring gear of the fourth planetary gear set, respectively; and
    wherein the thirteenth rotation element, the fourteenth rotation element, and the fifteenth rotation element are a fifth sun gear, a fifth planet carrier, and a fifth ring gear of the fifth planetary gear set, respectively.

20. The planetary gear train apparatus of claim 16, wherein the first, second, third, fourth, and fifth planetary gear sets are disposed in an order of the first, second, third, fourth, and fifth planetary gear sets from an engine side thereof.

* * * * *